(12) United States Patent
Walding

(10) Patent No.: US 6,600,815 B1
(45) Date of Patent: Jul. 29, 2003

(54) TELEPHONE NETWORK ACCESS ADAPTER

(75) Inventor: Andrew M. Walding, Plano, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/331,830

(22) PCT Filed: Dec. 23, 1997

(86) PCT No.: PCT/US97/24276

§ 371 (c)(1), (2), (4) Date: Sep. 24, 1999

(87) PCT Pub. No.: WO98/28902

PCT Pub. Date: Jul. 2, 1998

(30) Foreign Application Priority Data

Dec. 23, 1996 (GB) .............................................. 9626779

(51) Int. Cl.[7] ............................................. H04M 11/00
(52) U.S. Cl. .................................. 379/93.07; 379/93.09
(58) Field of Search ........................... 379/93.07, 93.06, 379/93.09, 93.11, 100.12, 93.01, 93.08, 93.05; 370/536, 542; 375/222

(56) References Cited

U.S. PATENT DOCUMENTS 4,862,456 A * 8/1989 Giorgio ...................... 370/276
5,056,133 A   10/1991 Iida ............................. 379/98
5,317,415 A * 5/1994 Kinami et al. ............... 358/434
5,390,239 A * 2/1995 Morris et al. ............ 379/93.08
5,809,070 A * 9/1998 Krishnan et al. ........... 375/222
5,923,671 A * 7/1999 Silverman .................... 370/542

FOREIGN PATENT DOCUMENTS

| EP | 0666680 | 8/1995 | .......... H04M/11/06 |
| GB | 2 289 812 A | 11/1995 | |
| GB | 2 298 547 A | 9/1998 | |
| WO | 9323949 | 11/1993 | .......... H04N/11/00 |

* cited by examiner

*Primary Examiner*—Stella Woo
(74) *Attorney, Agent, or Firm*—Baker Botts, LLP; V. Lawrence Sewell; Jessica W. Smith

(57) ABSTRACT

A telephone network access adapter for a computer includes a number of line ports for connection to telephone network lines, a subscriber port for connection to subscriber telephone equipment, a video port for connection to video equipment and a computer port for connection to computer equipment. The subscriber interface is connected to the subscriber port. A video interface is connected to the video port. A line interface selectively connects the external telephone line(s) to the subscriber interface and/or the video interface. A controller is connected to the computer port for controlling the operation of the adapter. The adapter is able to connect the subscriber telephone equipment and/or the video equipment and/or the computer equipment to a selectable number of external telephone lines, thus providing a flexible connection to the telephone system.

26 Claims, 3 Drawing Sheets

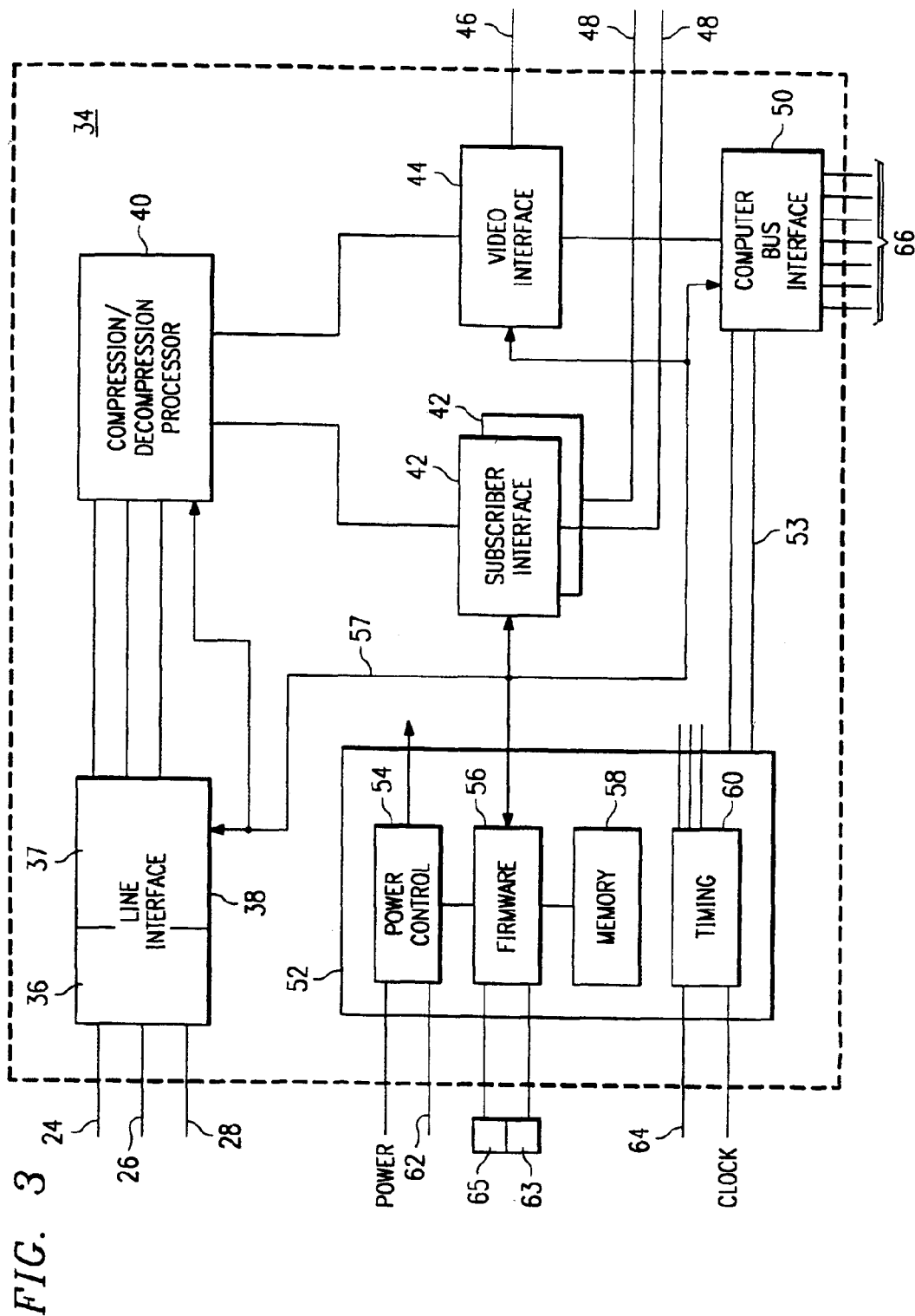

TELEPHONE NETWORK ACCESS ADAPTER

This invention relates to the use of a telephone network for the transmission of voice and other types of signals.

Traditionally, telephone systems developed as a medium for the transmission of analogue voice information. The analogue transmission of digital data is also possible using traditional telephony (often termed POTS—Plain Old Telephone System) with modems to modulate and demodulate the digital information. A traditional telephone line based on a twisted pair of copper wires has a bandwidth of 64 kbits/sec. Conventional telephone networks have, more recently, been used to provide digital telephony (e.g. ISDN) in which data and voice are transmitted in digital form (i.e. as a series of bits) using two separate 64 kbit/sec telephone lines for two way transmission (one for each direction). A conventional telephone system can also be used to provide dedicated digital data transmission.

In a conventional telephony system, a telephone company provides a so-called "port card", either at a switch or a local distribution point of the telephone network, which determines the type of service (e.g. POTS, ISDN or data services) provided on the telephone line(s) to subscriber's address. An appropriate number of twisted copper pairs are then run from the port card to the subscriber's home or business where one or more appliances such as telephones, fax machines, computers, etc. is/are connected.

In competition to conventional telephone systems, cable distribution systems (CATV) have been developed for providing video (e.g. television) and other services (including telephony services). Although CATV provides a relatively high bandwidth, cable television systems are essentially (e.g. 90%) one way broadcast systems which are not provided with efficient two-way capability. Typically, cable television systems are not provided with a dedicated return channel suitable for providing telephony services in an efficient bidirectional transmission manner. Also, CATV networks are typically only provided in relatively restricted areas.

EP-A-0,666,680 describes a telephone controller for selectively connecting a fax/modem/voice chipset or a telephone to one of two available telephone lines. Similarly, U.S. Pat. No. 5,056,133 describes a data communication apparatus with a switching circuit for selectively coupling a telephone circuit or a modem to a selected one of two telephone lines. WO-A-93/23949 describes a telephone terminal that is arranged to selectively connect different devices to a single telephone line.

There is therefore a need to provide mixed voice, data and video services in a convenient and efficient manner using the copper-based infrastructure already widely available including copper lines to subscriber's premises.

In accordance with a first aspect of the invention, there is provided a telephone network access adapter for a computer, the adapter comprising: at least two line ports for connection to a plurality of telephone network lines, a subscriber port for connection to subscriber telephone equipment, a video port for connection to video equipment and a computer port for connection to computer equipment; a subscriber interface connected to said subscriber port; a video interface connected to said video port; a line interface comprising a multiplexer/demultiplexer arranged to selectively connect said subscriber interface and/or said video interface to a selectable number of said plurality of telephone network lines to facilitate provision of different bandwidth services to said subscriber telephone equipment and/or said video equipment; and a controller connected to said computer port for controlling said adapter.

By providing a line interface which can selectively connect the external telephone line(s) to the subscriber interface and/or the video interface, a flexible line termination can be provided at a subscriber location for the connection of different media types.

Providing at least two line ports enables an option to receive or transmit a higher bandwidth. More preferably, the adapter comprises three line ports. Three line ports would provide sufficient capacity for the downloading of video information over, for example, a conventional telephone network to a subscriber location.

Preferably the controller is connected to the multiplexer/demultiplexer whereby the controller is able to provide internal control of the multiplexer/demultiplexer.

In a preferred embodiment of the invention, the adapter comprises three line ports, wherein the multiplexer/demultiplexer permits the selectable connection of one, two or three lines selectively to provide a bandwidth of one, two or three times that of a single line. This allows the selective reception and/or transmission of transmissions which have different bandwidths to optimise the use of the available lines. The lines are conventional 64 kbit/sec telephone lines.

Preferably, the line interface comprises compression/decompression logic for decompressing compressed signals received from the line port(s) and for compressing signals to be sent to the line port(s).

Preferably the compression/decompression and multiplexing/demultiplexing logic is selectively connectable under control of the control logic to the subscriber interface and/or the video interface in an information dependent manner. This enables a subscriber to receive and transmit information, whether that be voice, data or video or another information form in a desired manner.

Preferably, the video interface provides selectable connections between the line interface and the video port or between the line interface and the computer port or between the video port and the computer port. In particular, the video interface is preferably switchable to route video information from the line interface to the computer port for storage in the computer equipment, and is subsequently switchable to route video information from the computer port to the video port for supply to the video equipment.

The adapter can comprise a plug-in module, the computer port being connected to a standard computer module connector. Preferably, the module is a plug-in card.

The invention also provides a computer comprising a telephone network access adapter as set out above. In this case, the computer port is a computer bus connection.

Preferably the video interface is switchable to route video information from the line interface to a computer bus for storage in computer storage, and is subsequently switchable to route video information from the computer bus to the video port for supply to the video equipment.

By connecting the computer to a plurality of telephone lines, different bandwidth services can be provided using a selectable number of the plurality of lines.

By connecting the computer to two telephone lines it is possible selectively to provide, inter alia, analogue telephone services on one line, or digital telephone services on two lines, or video conferencing services on two lines, or video download services on two lines.

By additionally connecting the computer to a third telephone line it is possible selectively to provide, at the same time as analogue telephone services on one line, digital telephone services, or video conferencing services or video download services on two lines.

The invention further provides the use of a computer as set out above as the subscriber termination to a telephone network.

The invention further provides the use of a computer as set out above as the services on one line, or digital telephone services on two lines, or video conferencing subscriber termination of two telephone lines, selectively to provide, inter alia, analogue telephone services on two lines, or video download services on two lines.

The invention further provides the use of a computer as set out above as the subscriber termination of three telephone lines, selectively to provide, at the same time as analogue telephone services on one line, digital telephone services, or video conferencing services or video download services on two lines.

The invention further provides a method of providing multiple bandwidth services at a subscriber termination of a telephone network, said method comprising: connecting a computer including a telephone network access adapter having at least two line ports, each for connection to a telephone network line, a subscriber port for connection to subscriber telephone equipment, a video port for connection to video equipment and a computer bus connection, a subscriber interface connected to said subscriber port, a video interface connected to said video port, and a line interface; selectively connecting, by means of said line interface, said subscriber interface and/or said video interface to a selectable number of a plurality of telephone network lines to facilitate provision of different bandwidth services to said subscriber telephone equipment and/or said video equipment.

An embodiment of the invention is described hereinafter, by way of example only, with reference to the accompanying drawings in which like reference signs are applied to like elements and in which:

FIG. 3 is an example of a configuration of one example of a telephone network access adapter in accordance with the invention;

Figure 1:
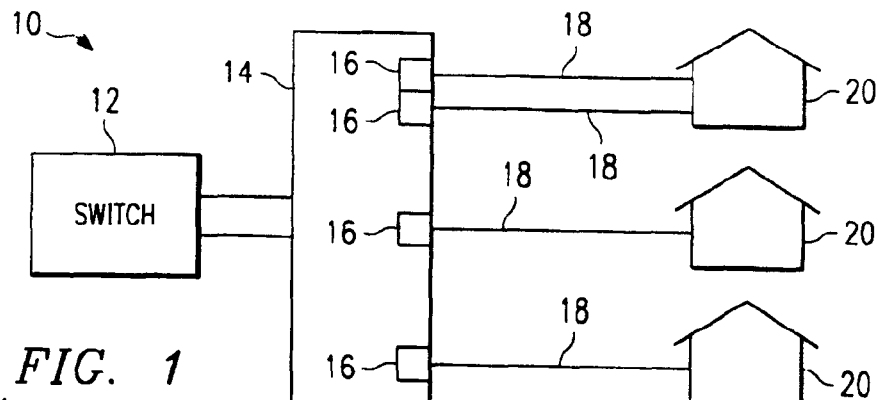
FIG. 1 is an example of parts of a typical telephone system.

FIG. 1 is a schematic block diagram of part of a conventional telephone system. FIG. 1 represents a telephone switch 12 which is connected to a local concentrator 14 for a local area serviced by the telephone system. The concentrator 14 includes a number of line port cards 16, each of which provides a connection on a respective line 18 to a subscriber's premises. It is possible for any particular subscriber 20 to subscribe to a selectable number of telephone lines 18, although each will be serviced as a separate telephone line from the port card 16. It is also known to provide digital data services (for example ISDN services) in which case a pair of lines 18 may be controlled together to form a single subscriber connection. However, once again, the control of this connection is performed at the concentrator 14 by the port cards 16.

It will be appreciated that the conventional arrangement is inflexible from the point of view of the subscriber in that the subscriber has to subscribe to a particular bandwidth (for example 1, 2 or more lines) and is then limited to the use of that bandwidth. The subscriber can, of course, be provided with a local switching exchange (PBX). However, this requires significant cost and still does not provide flexibility as to the bandwidth useable at any particular time.

An embodiment of the invention seeks to provide a solution to these problems by providing functionality which extends beyond that normally provided at the subscriber premises.

Figure 2:
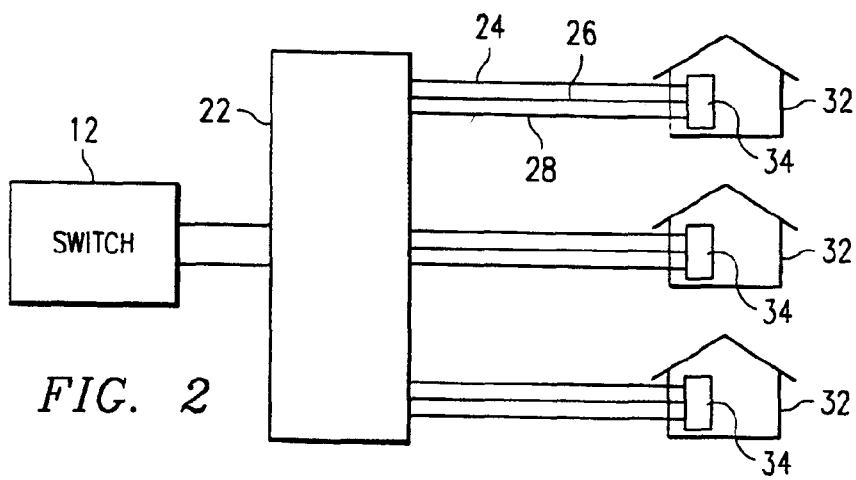
FIG. 2 is an example of a part of a telephone system for use with an embodiment of the invention.

FIG. 2 is a schematic diagram of an example of part of a telephone network configuration for use with an embodiment of this invention. In this embodiment, a switch 12 is connected via a concentrator 22 to individual subscriber premises 32. In this embodiment, a telephone network access adapter 34 is provided in each of the subscriber premises, the telephone network access adapter possibly providing at least some of the functions of the port cards 16 of FIG. 1. The adapter 34 is connected to a number, preferably a plurality, of telephone lines to the concentrator 22. In the particular example shown, three conventional 64 kbit telephone connections 24, 26, 28 are shown. However, in other embodiments, another number of lines having the same and/or different bandwidths could be provided.

FIG. 3 is a schematic overview of a configuration of a telephone network access adapter 34, for use with three telephone lines 24, 26 and 28. The telephone network access adapter could be configured as a separate stand-alone unit (e.g. as a it set-top-box"), or it could be implemented as a plug-in card for a computer, for example.

As shown in FIG. 3, each of the telephone lines 24, 26 and 28 is connected via a line interface 38 to the other components of the adapter 34. The line interface 38 includes a line termination section 36 and a distribution section 37. Thus, the line interface 38 provides multiplexing and demultiplexing functions for connection of the adapter 34 to the telephone lines 24, 26 and 28. The output of the line interface 38 is connected to a compression/decompression processor 40 which provides compression of outgoing and decompression of incoming data to and from the telephone lines 24, 26 and 28, if required. The compression/decompression processor 40 is in turn connected to one or more subscriber interfaces 42 which is or are connected to one or more subscriber ports 48 for the connection of conventional subscriber telephone equipment. The compression/decompression processor 40 is also connected to a video interface 44. The video (i.e. audio-visual) interface 44 is connected to one or more video ports (i.e. audio-visual) 46 for direct connection to video equipment, and to a parallel computer bus interface 50 for connection to a computer bus via lines 66.

Operation of the adapter 34 is performed under the control of a controller 52 which is connected to the various functional components described above via control lines 57. Further control lines 53 connect the controller 52 to the computer bus lines 66 via the computer bus interface 50. Power and timing connections (not shown) are also provided between the controller and the components described above.

The controller 52 comprises power control circuitry 54 receiving external power 62 and supplying controlled voltages to other components within the adapter 34 in a conventional manner. The controller 52 includes timing circuitry which can he under the control of an internal clock, or can be connected to receive external clock signals (e.g. at 64) or via the computer bus 66 connected to the bus interface 50. In the preferred embodiment of the controller, the control is provided by firmware 56 programmed in an ASIC. Alternatively, the controller 52 can comprise a microprocessor controller. In either case, memory 58 is provided for control data. Optionally, in particular where the adapter 34 is configured as a stand-alone unit, external user input devices 63 and a user display 65 can be provided in any suitable manner. Separate display and user input devices are no: needed where the adapter 34 is configured as a card for a personal computer or the like, as then the computer display and input devices can be used.

Preferably, the compression/decompression algorithms) used in the compression/decompression processor 40 is chosen to be any conventional or any suitable compression/ decompression algorithms). Each subscriber interface (telephone line adapter) 42 can comprise a conventional UART/modem module. This module will provide conventional phone pick-up detection line identification, and so on. The video interface module 44 enables selective connection (under control of the controller 52) of the compression/ decompression processor 40 to the video port 46 or the computer port 50. Likewise, the video module 44 preferably enables selective connection of the video port 46 to the compression/decompression processor 40 and the computer port 50. Moreover, the video interface 44 preferably enables selective connection of the computer port 50 to the compression/decompression processor 40 and the video port 46.

Figure 4:
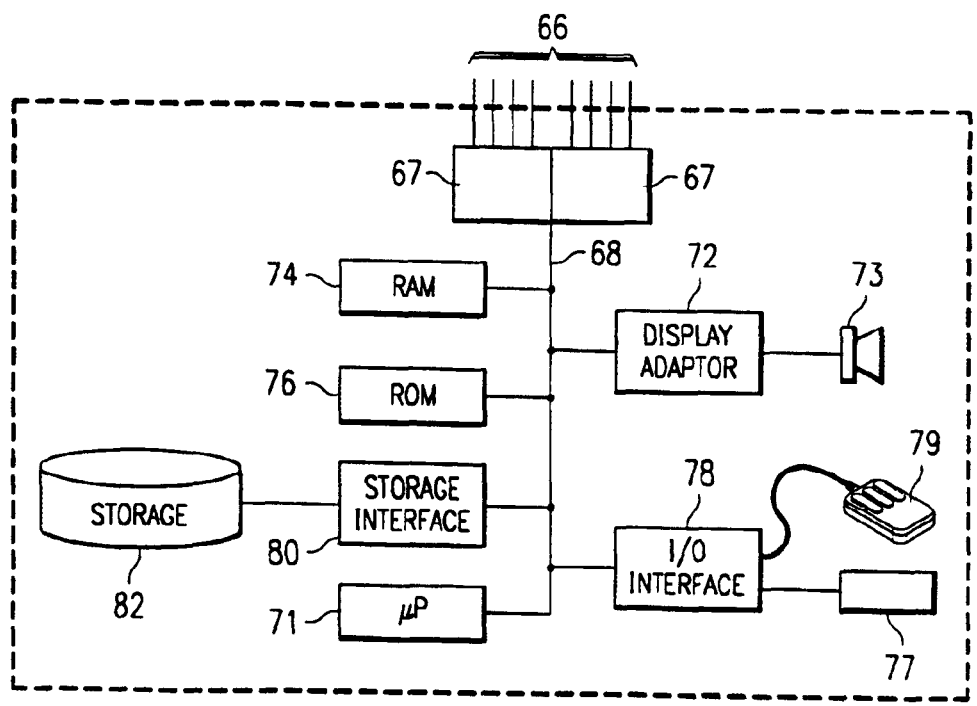
FIG. 4 is a schematic functional diagram of a personal computer for use with the adapter of FIG. 3.

It will be noted that the controller 52 is connected via connections 66 to the computer port 50 for receiving and transmitting control information to an attached personal computer (see FIG. 4). Where the adapter is configured as a stand-alone unit having a casing, suitable external connectors can be provided for the attachment of a parallel interface cable. Where the adapter is configured as a plug-in commuter card, the connections of the computer port can comprise conventional card connectors.

FIG. 4 is a schematic block diagram of a conventional personal computer for connection via first and second parallel ports 66 and first and second parallel interfaces 67 to the internal computer bus 68. As shown, the computer includes a microprocessor 71, a display adapter 72 connected to a display 73, an I/O interface 78 connected to user input devices (for example a keyboard 77 and a mouse 79), RAM 74 and ROM storage 76, as well as back-up storage 82 connected via a storage interface 80. It will be appreciated that the computer configuration shown in FIG. 4 is purely schematic and that any other suitable computer configuration may be used. In saying that the computer should have a suitable configuration, it is desirable in the context of the present invention that sufficient memory and processing power is provided in the computer to enable the storage of video data downloaded from the adapter 34 so that the computer can be used to provide temporary storage of video information prior to display on video equipment connected to the video port 46. Where the adapter 34 is configured as a plug-in card, it can be connected directly to the computer motherboard or in any other convention manner. In this manner, the adapter 34 could be an integral part of the computer system.

Figure 5:
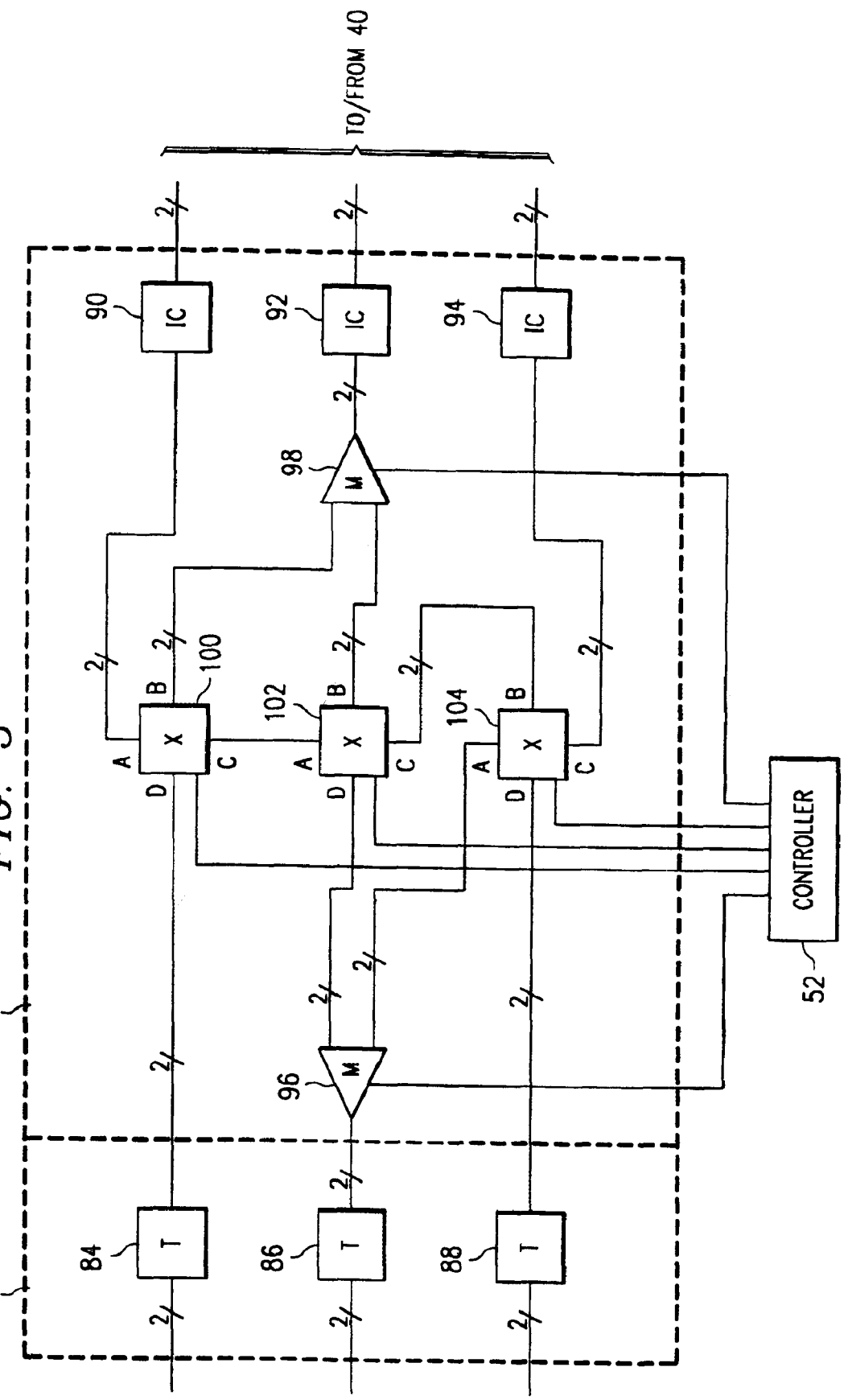
FIG. 5 is a detail of FIG. 3.

FIG. 5 is a schematic block diagram of the multiplexer/ demultiplexer stage 37 of the line interface 38.

As shown in FIG. 5, a plurality of line terminations T 84, 86, 88 represent the line terminators, including modems, etc, within the line termination section 36 of the line interface 38. The line terminations 84, 86 and 88 are connected to respective pairs of telephone lines 24, 26 and 28.

The distribution section 37 of the line interface 38 includes three cross connection switches 100, 102 and 104 and two multiplexer/demultiplexers M 96 and 98. The cross connection switches and the multiplexers are controlled from the controller 52, also represented schematically in FIG. 5. Internal connections 90, 92 and 94 provide connection points to the compression/compression processor 40. It should be noted that signal lines interconnecting the line terminations 84, 86, 88, the internal connections 90, 92, 94, via the multiplexers 96, 98 and the cross connection switches 100, 102 and 104 are in fact paired lines for two-way communication.

The cross connection switches have four pairs of terminals A, B, C, or D and permit the connection of any pair of terminals (say the pair of terminals A) to any pair of the remaining three pairs of terminals (say pair B). When a connection is thus made between two pairs of the terminals (say pair A to pair B), the remaining two pairs of terminals are automatically connected (say pair C to pair D). Thus the cross connection switches permit the connection of terminals A to B and C to D, or A to C and B to D, or A to D and B to C. The cross connection switches can be implemented using any suitable technology.

A pair of lines from the line termination 84 is connected directly to the pair of terminals D of the cross connection switch 100. A pair of lines from the line termination 86 is selectively connectable via the multiplexer 96 to the pair of terminals D of the cross connection switch 102 or to the pair of terminals A of the cross connection switch 104. A pair of lines from the line termination 88 is connected directly to pair of terminals D of the cross connection switch 104. A pair of lines extends between the pair of terminals C of the cross connection switch 100 and the pair of terminals A of the cross connection switch 102. A pair of lines extends between the pair of terminals C of the cross connection switch 102 and the pair of terminals B of the cross connection switch 104. A pair of lines from the internal connection 90 is connected directly to the pair of terminals A of the cross connection switch 100. A pair of lines from the internal connection 92 is selectively connectable via the multiplexer 98 to the pair of terminals B of the cross connection switch 100 or to the pair of terminals B of the cross connection switch 102. A pair of lines from the internal connection 94 is connected directly to pair of terminals C of the cross connection switch 104. The connection arrangement above allows the interconnection of any of the internal connections 90, 92 or 94 to any of the line terminations 84, 86 or 88 without blocking, by means of selected operation of the cross connection switches and the multiplexers under the control of the controller 52.

Using the structure described above with reference to FIG. 5, the telephone network access adapter is able, selectively and in a non-blocking manner, to connect the subscriber location to 1, 2, 3 (or possibly more) telephone network lines in order be able to handle a desired bandwidth. Thus, for example, it is possible to select a single telephone network line for a single telephone call. Also, it is possible at the same time to select two separate telephone lines for two telephone conversations using different subscriber equipment (assuming the telephone line interface 42 is able to connect to a plurality of subscriber ports 48). Also, it is possible to select one of two sets of the telephone lines for a video telephone or ISDN-connection using higher bandwidth. At the same time, it is possible to conduct a normal telephone call on the remaining telephone line. Also, it is possible to select three telephone network lines simultaneously for the downloading, for example, of video-on-demand signals. These can be stored temporarily in the storage of the personal computer by establishing connection between the compression/decompression processor 40 and the computer port 50. The video can then be replayed on the subscriber's existing domestic video equipment by connecting the computer port 50 via the video interface 44 to the video port 46.

Accordingly, an embodiment of the present invention enables a flexible termination of the telephone network at a subscriber's premises, enabling the subscriber to achieve efficient use of the telephone network bandwidth.

Although a particular embodiment of the invention has been shown, it would be appreciated that many modifications and/or additions are possible within the scope of the invention.

Thus, for example, although a single subscriber port 48 is shown, the subscriber interface may be configured to support a plurality of subscriber ports 48. Likewise, although a single video output 46 is provided, the video interface 44 can be configured to support a plurality of video ports, possibly using different standards for example digital and analogue. Also, although reference is made to a video port and a video interface, these could also be configured to provide audio services only.

What is claimed is:

1. A telephone network access adapter in a subscriber's premises, wherein the telephone network access adapter is connected by a plurality of external telephone lines to a switch in a telephone network, the telephone network access adapter comprising:
    a number of line ports for connection to the plurality of external telephone lines, a subscriber port for connection to subscriber telephone equipment in the subscriber's premises, a video port for connection to video equipment in the subscriber's premises;
    a subscriber interface connected to said subscriber port;
    a video interface connected to said video port;
    a line interface that can selectively switch one or more of said external telephone lines to said subscriber interface or to said video interface to adjust bandwidth serving said subscriber interface and said video interface; and
    a controller for controlling the network access adapter.

2. An adapter according to claim 1, comprising at least two line ports, wherein said line interface comprises a multiplexer/demultiplexer.

3. An adapter according to claim 2, comprising three line ports.

4. An adapter according to claim 2, wherein said controller is connected to said multiplexer/demultiplexer for controlling said multiplexer/demultiplexer.

5. An adapter according to claim 4, comprising three line ports, wherein said multiplexer/demultiplexer permits the selectable connection of one, two or three telephone lines selectively to provide a bandwidth of one, two or three times that of a single line.

6. An adapter according to claim 1, wherein said lines are 64 kbit/sec telephone lines.

7. An adapter according to claim 1, wherein said line interface comprises compression/decompression logic for decompressing signals received from said line port(s) and for compressing signals to be sent to said line port(s).

8. An adapter according to claim 7, wherein said compression/decompression logic is selectively connectable to said subscriber interface and/or said video interface in an information dependent manner.

9. An adapter according to claim 1, wherein said adapter comprises a plug-in module and includes a computer port for connection to computer equipment in the subscriber's premises, said computer port connecting to a standard computer module connector.

10. An adapter according to claim 9, wherein sad video interface provides selectable connections between said line interface and said video port or between said line interface and said computer port or between said video port and said computer port.

11. An adapter according to claim 10, wherein said video interface is switchable to route video information from said line interface to said computer port for storage in said computer equipment, and is subsequently switchable to route video information from said computer port to said video port for supply to said video equipment.

12. An adapter according to claim 9, wherein said module is a plug-in card.

13. The network access adapter according to claim 1, wherein said network access adapter is a stand alone unit.

14. A telephone network access adapter, the adapter comprising;
    a number of line ports for connection to telephone network lines, a subscriber port for connection to subscriber telephone equipment, a video port for connection to video equipment and a computer bus connection;
    a subscriber interface connected to said subscriber port;
    a video interface connected to said video port;
    a line interface selectively connecting said external telephone lines to said subscriber interface and/or said video interface; and
    a controller for said adapter.

15. A computer according to claim 14, wherein said video interface provides selectable connections between said line interface and said video port or between said line interface and said computer bus or between said video port and said computer bus.

16. A computer according to claim 15, wherein said video interface is switchable to route video information from said line interface to said computer bus for storage computer storage, and is subsequently switchable to route video information from said computer bus to said video port for supply to said video equipment.

17. A computer according to claim 14, connected to a plurality of telephone lines selectively to provide different bandwidth services using a selectable number of said plurality of lines.

18. A computer according to claim 17, connected to two telephone lines selectively to provide, inter alia, analogue telephone services on one line, or digital telephone services on two lines, or video conferencing services on two lines, or video download services on two lines.

19. A computer according to claim 18, additionally connected to a third telephone line selectively to provide, at the same time as analogue telephone services on one line, digital telephone services, or video conferencing services or video download services on two lines.

20. A method of providing multiple bandwidth services at a subscriber termination of a telephone network, said method comprising:
    connecting a computer at the subscriber termination of the telephone network to a plurality of telephone network lines, wherein the computer includes a telephone network access adapter having a number of line ports, each for connection to one of the plurality of telephone network lines, a subscriber port for connection to subscriber telephone equipment, a video port for connection to video equipment and a computer bus connection, a subscriber interface connected to said subscriber port, a video interface connected to said video port, and a line interface; and
    selectively connecting, by means of said line interface, said external telephone lines to said subscriber interface and/or said video interface to provide different bandwidth services using a selectable number of said plurality of telephone lines.

21. A method according to claim 20, wherein said computer is connected to two telephone lines, said method comprising the selective provision of, inter alia, analogue telephone services on one line, or digital telephone slices on two lines, or video conferencing services on two lines, or video download services on two lines.

22. A method according to claim 21, wherein said computer is additionally connected to a third telephone line, said method comprising the selective provision of, at the same time as analogue telephone services on one line, digital telephone services, or video conferencing services or video download services on two lines.

23. A telephone system, comprising:
- a switch for providing connection services to a plurality of subscriber premises;
- a plurality of network access adapters at the plurality of subscriber premises, wherein each of the plurality of network access adapters are connected to the switch by a plurality of external telephone lines and wherein each of the network access adapters comprise:
  - a number of line ports for connection to the plurality of external telephone lines,
  - a subscriber interface that connects to subscriber telephone equipment,
  - a video interface that connects to video equipment;
  - a line interface that can selectively connect one or more of the external telephone lines to the subscriber interface or to the video interface to handle a desired bandwidth; and
  - a controller for controlling the network access adapter.

24. The telephone system of claim 23, wherein the line interface comprises:
- a line termination section that terminates each of the external telephone lines at a termination unit; and
- an internal connection unit that connects the line interface to the subscriber and video interface; and
- a switch that can connect any signal from the external telephone lines to either the video or subscriber interface or connect any signal from the video and subscriber interface to any of the external telephone lines.

25. The telephone system of claim 24, further comprising:
- a concentrator, wherein the switch is connected via the concentrator to the plurality of network access adapters.

26. The telephone system of claim 24, wherein each of the network access adapters further comprise:
- a compression/decompression unit connected to the line interface, the video interface and the subscriber interface for providing compression of data signals to be transmitted on the external telephone lines and decompression of data signals received from the external telephone lines.

* * * * *